United States Patent Office 3,371,919
Patented Mar. 5, 1968

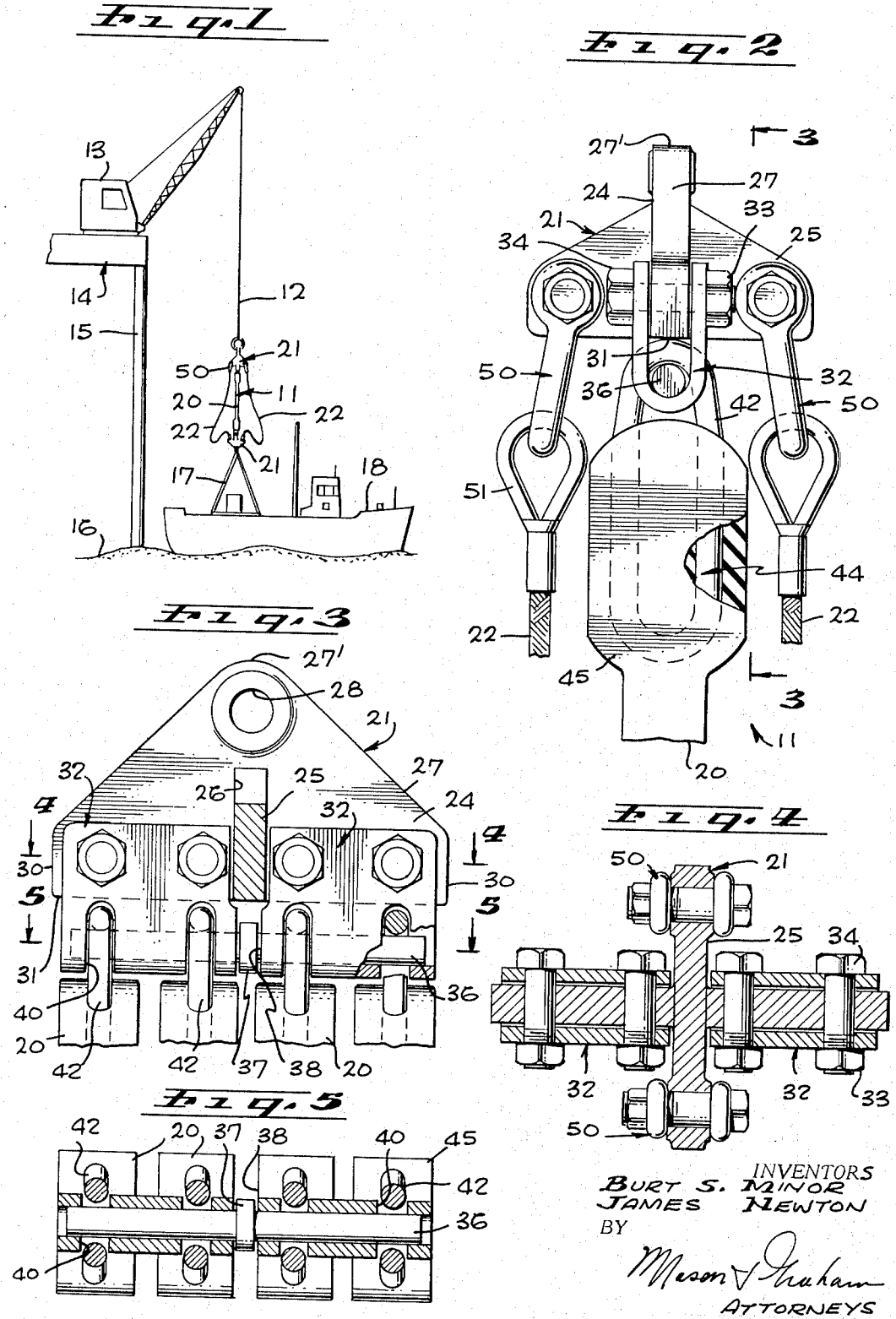

3,371,919
LOAD ABSORBING SNUBBING DEVICE
Burt S. Minor, La Habra, Calif., and James Newton, Lafayette, La., assignors to Bettis Rubber Company, Whittier, Calif., a corporation of California
Filed Nov. 24, 1965, Ser. No. 509,500
6 Claims. (Cl. 267—73)

ABSTRACT OF THE DISCLOSURE

The application discloses a load absorber device having a pair of hanger assemblies adapted to be connected in a line or cable, a plurality of elongated elastic tension members connected between the hanger assemblies and flexible snubber members connected between the hanger assemblies.

---

This invention has to do generally with load absorbing devices of the type adapted to be placed in tension by loads imposed thereon and particularly to such a device adapted to be incorporated in a line or cable.

There are many instances where it is desirable or necessary to have a load absorbing device in a cable or line that is subjected to tension loading, particularly where sudden loads are imposed upon the line. One example is in the case of a crane mounted on a pier or stationary platform at sea used for transferring men and material to and from ships. This operation is extremely hazardous in rough seas because of the abrupt and large movements of the ship.

An object of the invention is to provide a novel load or shock absorbing and snubbing device adapted to be mounted in a cable, line or the like, such as a hoisting line, for example, which serves as a safety device to protect the line against being broken and to cushion the loading of the line.

Another object is to provide a durable, heavy duty device of the type indicated embodying a plurality of tension members in combination with one or more flexible snubber lines which serve to limit the length to which the tension members can be stretched and which serve to carry a load over and above that carried by the tension members.

A further object is to provide a snubbing device having a novel hanger assembly for securing the ends of a plurality of tension members to a line or the like and for securing the ends of one or more snubber lines.

A general object is to provide novel means for securing a plurality of members to a common member.

These and other objects will be apparent from the drawing and the following description. Referring to the drawing:

FIG. 1 is a diagrammatic representation showing the invention in one environment in which it may be used;

FIG. 2 is an end elevational view, partly broken away, showing one end of a device embodying the invention;

FIG. 3 is a sectional view on line 3—3 of FIG. 2; and

FIGS. 4 and 5 are cross-sectional views on lines 4—4 and 5—5, respectively, of FIG. 3.

More particularly describing the invention, as previously indicated, the snubbing device of the invention, which is generally designated by numeral 11, is adapted to be incorporated in a line for the purpose of absorbing and cushioning loads and by way of illustration, it has been shown in FIG. 1, as connected in a hoisting line 12 from a crane 13 mounted on a platform 14 supported on piles 15 at a substantial distance above a body of water 16 which may be part of the ocean. Attached to the line 12 below the device 11 is a carrier 17 used for holding personnel and goods to be transferred to and from a ship 18.

The device itself comprises a plurality of elongated longitudinally expansible or stretchable tension members 20 connected between a pair of hanger assemblies 21 and one or more flexible snubber lines 22, also connected between the hanger assemblies 21. Preferably the hanger assembles at the ends of the members 20 are identical and thus a description of one will suffice.

Referring to the uppermost hanger 21 illustrated in detail in the drawings, this comprises a main body in the form of a plate 24 and a cross plate 25 received in a slot 26 of the body and welded thereto. The plate 24 is shaped as best shown in FIG. 3, having converging upper side edges 27 which terminate in a rounded upper edge or radius 27'. Below its top center the body is provided with a centrally disposed hole 28 by means of which the hanger can be suspended by any customary means. Below the edges 27 are vertical side edges 30 and extending between these is a straight bottom edge 31 interrupted by the slot 26.

Mounted on the main body 24 of the hanger is a pair of laterally spaced U-shaped straps 32. Each of these is detachably secured to the plate by suitable bolts 33 and nuts 34 in a manner such that the connecting or bridging portion of the U between the legs thereof extends beneath the lower edge 31 of the hanger. The straps support a pin or rod 36 which has a centrally disposed collar 37 integral therewith or fixed thereto and received in the space 38 between the straps 32.

The straps 32 are slotted at 40 to expose the pin 36 which is received in eye portions 42 of anchor loop members 44 which are embedded in enlarged end portions 45 of the tension members 20. The latter may be generally cylindrical and formed of a high grade of rubber, synthetic rubber, or plastic.

The cross plate 25 of the hanger is provided with two shackles 50 to which the aforementioned snubber lines 22 are secured by means of eyes 51 at their end. The snubber lines are substantially longer than the normal, unexpanded length of the tension members and do not come into play until the latter have been expanded to the safe limit from which they are designed.

In the use of the device, it is connected in a line or to the end of a line which will be subject to being placed in tension. Under either gradual or abrupt loading of the line, the tension members 20 stretch to absorb all or part of the load, depending upon the magnitude thereof. Any excess load over and beyond that designed to be carried by the tension members is carried by the snubber lines 22 after the initial loading of the tension members 20 and the longitudinal expansion thereof to the limit allowed by the length of the lines 22. It will be apparent that the device can be readily assembled and disassembled by reason of the detachable mounting of the members 32.

Although I have illustrated and described a preferred form of my invention, I contemplate that various changes and modifications can be made therein without departing from the invention, the scope of which is indicated by the following claims.

We claim:

1. In a load absorbing snubbing device, a hanger including a platelike body portion adapted to be attached to a hoisting line or the like, means attached to an edge portion of the body portion and providing a pin supporting section beyond the edge of the body portion, a pin carried in the pin supporting section of said means in parallel relation with the edge of the hanger, said means having a plurality of slots therein extending transversely of said pin, a plurality of elongated tension members, and an anchor member mounted in an end of each of said tension members and extending around said pin and being freely received in a slot in said means.

2. A hanger assembly for connecting a plurality of elements to a single line or the like, comprising a hanger member having a platelike body portion, means attached to an edge portion of said body portion and providing a pin supporting section beyond the edge of said body portion, and a pin carried in said pin supporting section, said means being slotted transversely of said pin to receive anchor members or the like in the ends of said elements to be connected and to enable said anchor members to extend around said pin.

3. A hanger assembly for connecting a plurality of elements to a single line or the like, comprising a hanger member having a platelike body, a pair of laterally spaced U-straps attached to an edge portion of the body and providing pin receiving loop sections therebeyond, a pin received in said loop sections, said pin having an enlargement intermediate its ends received between said U-straps and cooperating therewith to prevent longitudinal movement of said pin, said U-straps being slotted transversely of said pair whereby to receive looped anchors or the like extending around said pin and anchored in the ends of the elements to be connected.

4. A load absorbing snubbing device comprising a plurality of elongated elastic rubber tension members, an anchor member in each end of each of said tension members presenting an eye portion, a hanger beyond each end of said tension members, U-strap means mounted on each hanger and presenting a pin supporting section, a pin in each supporting section, the eye portions of the anchor members adjacent the respective pins receiving said pins, said U-strap means being slotted to freely receive said eye portions of said anchor members, and a pair of flexible snubber lines of substantially greater length than the normal unexpanded length of said tension members secured at their ends to said hangers.

5. In a load absorbing snubbing device, a hanger body adapted to be connected to a hoist line or the like, a transverse pin mounted on said hanger body, a plurality of elongated elastic tension members adapted, when loaded, to extend normal to the axis of the pin, and an anchor member embedded in the end of each tension member and presenting an external portion receiving said pin.

6. The device of claim 5 in which each anchor member comprises an elongated wire metal loop.

References Cited

UNITED STATES PATENTS

| | | | |
|---|---|---|---|
| 400,266 | 3/1889 | Stein | 267—73 |
| 3,306,600 | 2/1967 | Roux et al. | 267—74 |

FOREIGN PATENTS 1,021,652  12/1957  Germany.

ARTHUR L. LA POINT, *Primary Examiner.*

R. M. WOHLFARTH, *Assistant Examiner.*